United States Patent [19]
King et al.

[11] Patent Number: 5,807,594
[45] Date of Patent: Sep. 15, 1998

[54] METHOD FOR ENHANCING FEED EFFICIENCY IN RUMINANTS WITH AN ENCAPSULATING CHOLINE COMPOSITION

[75] Inventors: Bruce Dexter King, Troy, Ill.; Ronald Edward Rompala, Concord, N.H.

[73] Assignee: Ducoa, L.P., Highland, Ill.

[21] Appl. No.: 806,460

[22] Filed: Feb. 26, 1997

[51] Int. Cl.$^6$ ........................................ A23L 1/00
[52] U.S. Cl. .............................. 426/2; 426/635; 424/438; 424/451; 424/490
[58] Field of Search ............................... 426/2, 807, 635; 424/438, 451, 490

[56] References Cited

U.S. PATENT DOCUMENTS

| Re. 35,162 | 2/1996 | Dreguesku et al. | 424/438 |
|---|---|---|---|
| 3,873,719 | 3/1975 | Lorz et al. | 424/312 |
| 4,394,377 | 7/1983 | Spires | 424/177 |
| 4,409,392 | 10/1983 | Hodge | 549/270 |
| 5,190,775 | 3/1993 | Klose | 426/2 |
| 5,496,571 | 3/1996 | Blagdon et al. | 426/2 |
| 5,518,730 | 5/1996 | Fuisz | 424/426 |
| 5,571,527 | 11/1996 | Nishimura et al. | 424/438 |
| 5,662,917 | 9/1997 | Kim et al. | 424/422 |

FOREIGN PATENT DOCUMENTS

| 2150023 | 6/1985 | United Kingdom . |
|---|---|---|
| 9221249 | 12/1992 | WIPO . |
| WO 96/08168 | 3/1996 | WIPO . |

OTHER PUBLICATIONS

Richard A. Erdman, et al., Effect of Dietary Rumen–Protected Choline in Lactating Dairy Cows, *Journal of Dairy Sciences*, 74, 1641–1647, 1991.

Richard A. Erdman, et al., Dietary Choline for the Lactating Cow; Possible Effects on Milk Fat Synthesis, *Journal of Dairy Sciences*, 67, 410–415, 1984.

I. A. Dryer, et al., Are Mature Cattle Getting Their Choline Needs, *Reprinted from Feed Age*, Jun. 1966.

Rumsey, Can. J. Anim. Sci., vol. 65, pp. 135–146, 1985.

Sharma et al., J. Dairy Sci., vol. 72, pp. 2772–2776, 1989.

*Primary Examiner*—Chhaya D. Sayala

[57] ABSTRACT

A method of enhancing weight gain and feed efficiency in a ruminant, comprising administering to the ruminant a feed efficiency enhancing amount of a choline-containing composition, wherein the choline-containing composition is encapsulated in such a manner as to reduce decomposition of the choline-containing composition in the rumen of the ruminant when administered.

8 Claims, No Drawings

METHOD FOR ENHANCING FEED EFFICIENCY IN RUMINANTS WITH AN ENCAPSULATING CHOLINE COMPOSITION

FIELD OF THE INVENTION

This invention relates to a feedstuff additive and, method for, promoting the growth of ruminants and improving the rate of weight gain while also improving the efficiency of feed utilization in ruminants.

BACKGROUND OF THE INVENTION

The efficiency of feed conversion into body weight varies significantly among different species of animals. Feed is a relatively expensive cost factor in the production of food-producing animals, totaling 70–80% of the cost of production. Thus, any improvement in the ability of the animal to convert feed into food products can directly improve the profitability of a food producer.

Choline, and/or its derivatives, is an essential nutrient for normal animal growth and performance and has been used to supplement most monogastric animal diets for years. Choline is an essential component for cell walls, nerve transmission (acetylcholine), fat metabolism (phosphatydal choline in lecithin), and prevention of perosis. Monogastrics require choline in the diet because they cannot produce sufficient quantities within their body for normal functions. Historically, the supplementing of choline to monogastrics was the only use of choline products because it was generally believed that ruminant animals received their "supplemental" choline from microbial synthesis within the rumen.

About 15 years ago it was shown by Richard A. Erdman, at the University of Maryland, that supplemental choline in dairy cattle could have a beneficial effect on milk and milk fat production. (Richard A. Erdman, *Journal of Dairy Sciences*, 74:5, pp. 1641–1647, 1981; Richard A. Erdman, *Journal of Dairy Sciences*, 67:410, 1984). This effect was initially shown by infusing choline (as chloride) into the stomach (abomasum) of the dairy cow. The outcome described above was reasonably predictable considering choline's known effect on fat metabolism and transport. Thus, choline would help transport fat from the liver, thereby possibly increasing milk production by increasing the fat production for milk.

Similar results were published in 1996 in U.S. Pat. No. 5,496,571 ('571) to Blagdon et al., and International Publication No. WO 96/08168 ('168) to Chandler. The '571 patent discloses a method of increasing the production of milk in a ruminant by orally administering to the ruminant encapsulated choline. The '168 publication discloses a ruminant feedstuff which comprises a post-ruminally effective choline compound coated within a protective matrix comprising at least one fatty acid or fatty acid soap. The particular use disclosed in the publication is enhancing milk yields in dairy cattle.

On the other hand, the use of choline in non-lactating ruminant animals has been given very little attention, owing to the basic thought that rumen microbes produce sufficient choline for normal animal growth and production. The earliest report of any effect that choline had on beef cattle was made by Dr. I. A. Dyer at Washington State University (I. A. Dyer, *Feed Age*, June 1966). Dyer supplemented ruminant diets with unprotected choline (i.e. the choline was not ruminally protected). The relevant finding in the study was that the supplemental choline improved the fat content of muscle tissue. However, this study was never repeated and thus the data were not confirmed. In addition, it is well known in the art that up to 99% of unprotected choline is degraded by rumen microbes in minutes. Therefore, it is reasonable to assume that if the fat content of muscle did increase, it could very well have been due to choline's relationship to fat transport within the body. Because the fat would not have any place to be excreted (as with milk in dairy cows) it may have been deposited in the muscle tissue.

U.S. Pat. No. 3,873,719 ('719) discloses the use of choline stearate to improve beef production in cattle. As with Dyer, the choline stearate of the '719 patent was fed to the cattle without a means for by-passing the rumen, and thus most of the choline was likely decomposed by the rumen. Although stearic acid can be used to encapsulate choline to protect it from the rumen, choline stearate does not, by itself, protect choline from the rumen. Thus, it is highly unlikely that the increased beef production was due to the choline since most of the choline was degraded by the rumen. In addition, feeding of fat (i.e. stearic acid) is currently being used to increase gain in beef cattle and increase milk production in dairy cattle.

SUMMARY OF THE INVENTION

One aspect of the invention is a method of enhancing weight gain and feed efficiency in a ruminant, comprising administering to the ruminant a feed efficiency enhancing amount of choline, wherein the method of administration of the choline minimizes decomposition of the choline in the rumen.

Another aspect of the invention is a feedstuff additive for enhancing weight gain and feed efficiency in a ruminant, comprising a feed efficiency enhancing amount of choline, wherein the method of administration of the choline minimizes decomposition of the choline in the rumen.

DETAILED DESCRIPTION OF THE INVENTION DEFINITIONS

The term "ruminant" means an even-toed hoofed animal which has a complex 3- or 4-chambered stomach and which is characterized by chewing again what it has already swallowed. Some examples of ruminants include cattle, bison, sheep and goats.

The term "ruminally protected" means having the capability of passing through the rumen without being substantially decomposed.

The term "post-ruminally effective choline" means orally administered choline which passes through the rumen but does not take effect until it has reached a point past the rumen.

The term "encapsulating composition" means a composition capable of and used for completely surrounding another composition or compound as if in an envelope or a capsule, thus not allowing any foreign material to reach the other encapsulated composition until the encapsulating composition has dissipated.

The term "choline" means choline itself, choline derivatives, a choline containing composition, a choline compound or mixtures of choline compounds.

The term "feed efficiency" means the amount of feed needed to obtain a given amount of weight gain. In particular, feed efficiency expresses the efficiency by which an animal converts feed into weight gain. Feed efficiency is expressed as the ratio of weight of feed to weight gain.

The term "weight gain" means an increase in weight.

Although the terms "feed efficiency" and "weight gain" are often used together, there is a significant difference between the two as can be seen by the above definitions. Specifically, the determination of feed efficiency depends upon a given weight gain whereas the determination of weight gain does not depend upon a given feed efficiency. The differences are especially significant to an animal producer. In particular, weight gain can be achieved with little, no or even negative change in feed efficiency. Thus, for the animal producer, merely obtaining increases in weight gain may not necessarily be a more cost effective method for growth of the animal. While a producer looks at numerous factors in determining the cost of production, feed efficiency is probably the most important and has the most impact on cost per pound of meat produced.

The Invention

Conventional thought has been and still is that ruminants do not require supplemental choline for normal production parameters such as growth and feed efficiency. Thus it was surprising when applicants determined that supplemental post-ruminally active choline in the diet of ruminants resulted in significant improvements in feed efficiency and weight gain in these animals.

Applicants provide an additive for feedstuff comprising ruminally protected choline which enhances both feed efficiency and weight gain in ruminants. Further, applicants provide a method for enhancing weight gain and feed efficiency in ruminants which comprises administering to a ruminant a feed efficiency enhancing amount of the ruminally protected choline wherein the choline is encapsulated in an encapsulating composition that protects the choline against breakdown and metabolism by microorganisms in the rumen of the ruminant.

The choline feed additive can increase feed efficiency in any ruminant. Some examples of ruminants which can experience increased weight gain and feed efficiency from being administered ruminally protected choline include cattle, goats, sheep, deer, antelope and oxen. However, the greatest significance of this invention regards the effect of choline on cattle which are not of the dairy producing type (i.e. beef cattle).

The Choline

The composition which is delivered to the animal need only consist of choline. Choline is available in many forms such as choline, choline chloride, choline bitartrate, choline dihydrogen citrate, choline bicarbonate, choline sulfate and choline hydroxide, among other derivatives.

In a preferred embodiment, choline chloride is used because it is readily available and has a high specific choline content. However, any choline form is applicable to this invention because it is the choline itself, not the form it is in, that is the active ingredient bringing about the increase in feed efficiency. As described in more detail below, it is critical that the choline be post-ruminally active. As such, if the choline is to be administered orally, it must be protected from destruction in the rumen. This is accomplished by, for example, encapsulating the choline in a ruminally protective encapsulating composition.

Rumen By-Pass

Choline is not effective unless it is delivered by a method which avoids decomposition in the rumen. In other words, the choline must be post-ruminally effective. In order to bypass the rumen, the choline must either be protected from decomposition by the rumen, or it must be delivered directly to the digestive system at a location past the rumen. The preferred method of delivery of the choline is orally. As such, it is preferable to encapsulate the choline in a ruminally protective encapsulating composition. The use of an encapsulating composition makes the delivery process easier because the ruminally protected choline can be mixed directly with the feedstuff allowing the ruminant to ingest the choline while eating.

If an encapsulating composition is used for delivery, it must be one which protects the choline from metabolism by microorganisms in the rumen, but it must also have the ability to dissipate once it reaches the rest of the ruminant's digestive tract. In fact, it is preferred that, once it has passed the rumen, the choline is released in the abomasum and lower intestinal tract of the ruminant. These conditions require that the encapsulating composition have a melting point of $\geq 40°$ C. because the temperature within the rumen is approximately $39°$ C. It is preferred that the melting temperature of the encapsulating composition range from $40°$ C. to $65°$ C. It is further preferred that the encapsulating composition be water insoluble and generally safe for ruminant consumption. The coating generally begins to be digested by the low pH of the stomach (at least to the point that choline is released) and then further digested by the enzymes of the intestine (bile, salts, lipases, etc.) and then usually absorbed in the small intestine. pH sensitive polymers which are typically used as encapsulating compositions in the food and drug industry, such as cellulose, can also be used in the invention.

As a general point, longer chain fatty acids can be used as the encapsulating material because they tend to have higher melting points. Suitable encapsulating or coating materials for use in the invention include: hydrogenated vegetable oils, mono- and di-glycerides, bees wax, paraffin wax, microcrystalline wax, sunflower seed fats, organic acids, palmitic acid, stearic acid, oleic acid, calcium stearate, calcium palmitate, synthetic waxes, hydrogenated castor oil and poly(vinyl alcohol), hydrogenated tallow and animal fats, substituted bees wax, synthetic paraffin wax, crystalline polyethylene and poly(ethylene glycol). Of course, mixtures of any of the just mentioned encapsulating materials can be used to impart particular combinations of physical properties to the encapsulated particles. In addition, other compositions which, for example, effect release in low pH, can be incorporated into the encapsulating composition, and in general, any coating composition which is water insoluble or immiscible should work. An example includes $CaCO_3$, among others. The preferred encapsulating composition comprises palmitic acid, stearic acid, oleic acid, calcium stearate, calcium palmitate, or mixtures thereof. It should be kept in mind that with whichever coating is chosen, the coating should be a continuous coating which protects the choline while in the rumen. Such techniques are known by those having skill in the art.

The percentage of coating of the encapsulant around the choline can vary significantly so long as it is sufficient to protect the choline from rumen destruction and releases choline when past the rumen. It is preferred that the percentage of encapsulant coating range from 10–70% by weight of the entire coated particle.

It is helpful if the form of the choline is either liquid immiscible in the encapsulating medium or is readily soluble in a liquid which is immiscible in the encapsulating media. In addition, the choline can remain in a dry form so long as the dry form is suitable to be coated with an encapsulating media.

Any other delivery form which allows the choline to remain inert in the rumen but readily absorbed in the remainder of the digestive tract is suitable for use in the invention. Some examples include intraperitoneal and intravenous injection, intramuscular infusion past the rumen or implant under the skin. However, these methods are generally very expensive and impractical for use on a daily basis.

Administration

When administering the choline orally, the size of the choline capsule can vary significantly, as long as the ruminant can swallow it. However, it is preferred that the capsule have a diameter of less than 2 millimeters, and it is even more preferred that the diameter range from 0.5–1.5 millimeters. Similarly, the shape of the capsule can be any shape, so long as it does not interfere with the ability of the ruminant to swallow it. It is preferred that the capsule have a rounded or spherical shape to promote easy swallowing. With regard to density, the encapsulated choline should have a specific gravity which is slightly heavier than water (i.e. >1), thus preventing the capsule from floating. It is preferred that the encapsulated choline have a specific gravity in the range of 1.1–1.2.

In order to see increases in both weight gain and feed efficiency, the choline should be administered in amounts and at intervals effective to maintain the desired level of choline in the blood of the ruminant. Effective time intervals can be daily, every other day, weekly or at such other times depending on such factors as, for example, the weight of the ruminant or the level of choline in the ruminants blood. It is preferred that the ruminant receives from 1 to 50 grams of choline per day. In particular, dairy ruminants should be administered choline at a level of 10–40 grams per day, while non-lactating ruminants should receive choline at a level of 1–50 grams per day. The greatest increases in feed efficiency in non-lactating ruminants are seen when the ruminant is administered from 2–10 grams of choline per day. It has been observed that administration of choline at levels greater than 50 grams tends to have a negative effect on feed consumption.

The ruminally protected, post-ruminally effective choline can simply be fed to the animal as a separate feedstuff ration, or it can be mixed with the animal's usual feedstuff ration. Generally, the ruminally protected choline can be mixed with either the complete feedstuff ration or individual ingredients thereof. Examples of individual ingredients include corn, rice, wheat, milo, soybean meal, cotton seed meal, wheat bran, defatted rice bran, fish meal, skim milk, dried whey, oils, fats, alfalfa meal, molasses, liquid supplements and premix with vitamins. In addition to feed rations, the choline can be mixed with other feedstuff additives including calcium carbonate, dicalcium carbonate, tricalcium carbonate, dicalcium phosphate, tricalcium phosphate, sodium chloride, vitamins A, D, E, $B_1$, $B_2$, $B_6$, $B_{12}$, calcium pantothenate, nicotinamide, folic acid, amino acids (e.g. lysine methionine, etc), mineral sources (e.g. Magnesium sulfate, ferrous sulfate, copper sulfate, zinc sulfate, potassium iodide, cobalt sulfate, etc.) or the like.

Preferably, the choline capsules are mixed into the concentrate base mix or premix ration which has a similar particle size. As an alternative, the choline capsules can be applied by hand or mechanically onto the feed before the animal consumes it (i.e. "top dressed").

The advantages and properties of this invention can be observed by reference to the following examples which illustrate the invention.

EXAMPLE

Administration of Ruminally Protected Choline to Beef Steers 160 medium to large framed beef steers (British x Continental breed cross) were housed in sixteen pens holding ten steers per pen. The 80 steers of heaviest body weight were assigned to a first set of pens, while the remaining 80 steers of lightest body weight were assigned to a second set of pens. Steers in the second set of pens were fed 170 pounds of the assigned treatment diet, while steers in the first set of pens were fed 180 pounds of the assigned treatment diet.

Four dietary treatments were applied in a randomized block design. The four treatments comprised 90% by weight concentrate diets with graded levels of ruminally protected choline (RPC) as follows:

1. Control—90% concentrate diet with no RPC;
2. RPC—5—90% concentrate diet with 0.245% (Dry Matter basis) RPC;
3. RPC—10—90% concentrate diet with 0.49% (Dry Matter basis) RPC; and
4. RPC—20—90%concentrate diet with 0.98% (Dry Matter basis) RPC.

Ingredients of the concentrate diet are listed in Table 1 below. The percentages of RPC were designed to supply 0, 5, 10 and 20 grams respectively of choline per animal daily (assuming an intake of 9.5 kilograms/day of Dry Matter and 21.5% ruminal escape choline in RPC).

TABLE 1

| Item (% of Total Dry Matter Basis) | Control | RPC-5 | RPC-10 | RPC-20 |
| --- | --- | --- | --- | --- |
| 20 | | | | |
| Sudangrass hay | 4.20 | 4.20 | 4.20 | 4.20 |
| Alfalfa hay | 6.10 | 6.10 | 6.10 | 6.10 |
| Whole shelled corn | 10.16 | 10.15 | 10.16 | 10.16 |
| Steam-flaked corn | 63.58 | 63.36 | 63.09 | 62.58 |
| Soybean meal | 4.01 | 4.00 | 4.01 | 4.01 |
| Molasses | 4.92 | 4.92 | 4.92 | 4.91 |
| Fat (yellow grease) | 3.10 | 3.09 | 3.09 | 3.10 |
| Limestone | 0.77 | 0.77 | 0.77 | 0.77 |
| Dicalcium phosphate | 0.50 | 0.50 | 0.50 | 0.52 |
| Salt | 0.36 | 0.36 | 0.36 | 0.36 |
| Urea | 1.03 | 1.03 | 1.03 | 1.03 |
| Ammonium sulfate | 0.25 | 0.25 | 0.25 | 0.25 |
| Premix* | 1.02 | 1.02 | 1.02 | 1.02 |
| Ruminally Protected Choline | — | 0.25 | 0.50 | 0.99 |

*Premix composition (Dry matter basis): 90.478% wheat middlings; 0.665% vitamin A (30,000 IU/gram on a 90% dry matter basis); 0.27% vitamin E (500 IU/gram on a 90% dry matter basis); 1.687% Rumensin (80 grams/pound on a 90% dry matter basis); 0.9% Tylan ™ (40 grams/pound on a 90% dry matter basis); and 6% trace mineral. Trace mineral contained, on dry matter basis, the following ingredients: cobalt carbonate (0.362%); copper sulfate pentahydrate (3.268%); calcium iodate (0.269%); ferrous sulfate monohydrate (19.445%); manganous oxide (6.944%); zinc sulfate monohydrate (28.169%); magnesium oxide (29.762%); wheat middlings (8.831%); and mineral oil (2.95%).

All diets were mixed in a 4,000 pound capacity Oswalt capacity feed mixer. Accuracy of the feed mill weighing system is ±1 pound. Premixes and RPC were weighed individually on an Ohaus 220—pound electronic platform balance (±1pound) and transferred to the main mixer via a pneumatic air-lift/air-lock system.

The Control diet was mixed first, followed in order by the RPC-5, RPC-10 and RPC-20 diets. Each feed bunk (common feeding trough) of the 16 pens was evaluated visually at approximately 7:30 a.m. daily. The quantity of feed remaining in each bunk was estimated, and the daily allotment of feed for each pen was recorded. This bunk-reading process was designed to allow for little or no accumulation of unconsumed feed (0 to 1 pound per pen).

After days 28, 56 and 84 on feed, steers in all pens were weighed before the morning feeding. These non-shrunk weights (by non-shrunk weights is meant weights taken without removing ruminants from feed prior to weighing)

were taken to assess performance of the cattle on a regular basis. Steers in the first set of pens were weighed for a final time on day 111 and again on day 112 and shipped to a commercial slaughter facility to obtain carcass data. Final body weight for the steers in the first set of pens was the average of body weight measurements taken on days 111 and 112. Steers in the second set of pens were fed for 140 days before shipment to the commercial slaughter facility, and final body weight measurements for steers in the second set of pens were the average of body weight measurements taken on days 139 and 140. All body weight measurements taken during the experiment were obtained using a single-animal scale connected to Tru-Test Heavy Duty Load Bars linked to a Tru-Test Model 702 digital indicator (Tru-Test, Inc., San Antonio, Tex.). Average body weight measurements as well as feed efficiency ratios are shown in Table 2 below.

TABLE 2

Effect of RPC on Weight of Steers

| | TREATMENT | | | |
|---|---|---|---|---|
| Item | Control | RPC-5 | RPC-10 | RPC-20 |
| Initial Body Weight, lb/kg | 775.1/351.6 | 772.9/350.6 | 773.0/350.6 | 773.9/351 |
| Final Body Weight, lb/kg | 1,162.7/527.4 | 1,201.0/544.8 | 1,175.6/533.3 | 1,159.7/526 |
| Daily Gain (lb/steer/kg/steer) | | | | |
| d 0 to 28 | 3.60/1.63 | 4.05/1.84 | 3.72/1.69 | 3.67/1.66 |
| d 0 to 56 | 3.19/1.45 | 3.59/1.163 | 3.35/1.52 | 3.29/1.49 |
| d 0 to 84 | 3.14/1.42 | 3.49/1.58 | 3.33/1.51 | 3.21/1.46 |
| d 0 to 112 | 3.11/1.41 | 3.46/1.57 | 3.28/1.49 | 3.13/1.42 |
| d 0 to end | 3.05/1.38 | 3.39/1.54 | 3.18/1.44 | 3.07/1.39 |
| Daily Dry Matter Intake (lb/steer/kg/steer) | | | | |
| d 0 to 28 | 17.16/7.78 | 17.61/7.99 | 17.75/8.05 | 17.42/7.90 |
| d 0 to 56 | 17.70/8.03 | 18.29/8.30 | 18.40/8.35 | 18.38/8.34 |
| d 0 to 84 | 18.03/8.18 | 18.73/8.50 | 18.65/8.46 | 18.73/8.50 |
| d 0 to 112 | 18.09/8.21 | 18.96/8.60 | 18.73/8.50 | 18.73/8.50 |
| d 0 to end | 18.24/8.27 | 19.01/8.62 | 18.75/8.51 | 18.72/8.49 |
| Feed:Gain | | | | |
| d 0 to 28 | 4.79 | 4.39 | 4.84 | 4.75 |
| d 0 to 56 | 5.65 | 5.14 | 5.56 | 5.60 |
| d 0 to 84 | 5.83 | 5.41 | 5.67 | 5.84 |
| d 0 to 112 | 5.89 | 5.51 | 5.77 | 5.99 |
| d 0 to end | 6.03 | 5.62 | 5.93 | 6.11 |

The data in Table 2 show the following. With regard to increased body weight, the greatest increase was seen in the cattle fed the RPC-5 treatment, followed by the RPC-10 treatment. The RPC-20 treatment resulted in body weight increases similar to the control.

Daily gain followed the same trend as final body weight, with quadratic or cubic responses (with statistical significance having a P value less than 0.10) to RPC level throughout the experiment. For the overall experiment, daily gain responded cubically (P value <0.10) to RPC level, with a 10% increase in daily gain for the RPC-5 treatment and a 4.3% increase for the RPC-10 treatment relative to the control treatment. Daily gain was virtually the same for the Control and RPC-20 treatment.

The most significant response in daily dry matter intake was during the first 28 days of the experiment, at which time the response to RPC level was quadratic (P<0.10). For the overall experiment, dry matter intake was greatest with the RPC-5 diet (4.2% increase relative to the Control diet), followed by the RPC-10 and RPC-20 diets, and least for the Control diet.

Feed:gain ratio responded cubically to RPC level during days 0 to 28 (P<0.10), days 0 to 56 (P<0.05), and for the overall experiment (P<0.10). Feed: gain was least for the RPC-5 treatment throughout the experiment with an overall improvement in feed efficiency of 6.8% relative to the control treatment. The RPC-10 treatment was generally superior to the control while the PC-20 treatment was about equal to the control treatments.

The results in the response in daily gain and feed:gain to RPC suggest that the optimum level of RPC was supplied by the RPC-5 treatment (0.245% RPC in the dietary dry matter). Based on the average dry matter intake for the experiment, the RPC-5 treatment supplied approximately 4.6 grams of RPC daily (assuming a value of 21.5% escape choline in the product).

In summary, administration of a ruminally protected choline composition to beef finishing cattle improved rate of weight gain, feed intake and feed efficiency. The best response was observed in cattle fed a ruminally protected choline composition containing approximately 4.6 grams of choline per day. At this level of administration, rate of weight gain, feed intake and feed efficiency was 10%, 4.2%, and 6.8% greater than controls respectively. These increases were demonstrated in diets already containing several feed efficiency enhancing additives. The magnitude of these increases compares favorably with other feed additives currently being used today.

What is claimed:

1. A method of enhancing weight gain and feed efficiency in a ruminant, comprising administering to the ruminant a feed efficiency enhancing amount of a choline, wherein the choline is ruminally protected in an encapsulating composition.

2. The method of claim 1 wherein the encapsulating composition is selected from the group consisting of hydrogenated vegetable oils, mono- and di-glycerides, bees wax, paraffin wax, microcrystalline wax, sunflower seed fats, organic acids, palmitic acid, stearic acid, oleic acid, calcium stearate, calcium palmitate, synthetic waxes, hydrogenated castor oil and poly(vinyl alcohol), hydrogenated tallow and animal fats, substituted bees wax, synthetic paraffin wax, crystalline polyethylene and poly(ethylene glycol).

3. The method of claim 1 wherein the ruminant is selected from the group consisting of cattle, goats, sheep, deer, antelope and oxen.

4. The method of claim 1 wherein the ruminant is a non-lactating ruminant.

5. The method of claim 1 wherein the choline is selected from the group consisting of choline chloride, choline dihydrogen citrate, choline bicarbonate, choline sulfate and choline hydroxide.

6. The method of claim 1 wherein the ruminant is administered daily an amount of a choline-containing composition containing 1 to 50 grams of choline.

7. The method of claim 1 wherein the ruminant is administered daily an amount of a choline-containing composition containing 2 to 10 grams of choline.

8. The method of claim 1 wherein the ruminally protected choline composition is administered orally.

* * * * *